United States Patent [19]

Wilson

[11] 4,000,445
[45] Dec. 28, 1976

[54] TRIP CIRCUIT FOR AN ELECTRIC CIRCUIT BREAKER

[75] Inventor: Walter Raymond Wilson, Wallingford, Pa.

[73] Assignee: General Electric Company, Philadelphia, Pa.

[22] Filed: Dec. 5, 1975

[21] Appl. No.: 637,997

[52] U.S. Cl. .................... 317/33 SC; 317/36 TD; 317/148.5 B; 317/52; 317/60 A

[51] Int. Cl.$^2$ .................... H02H 7/22; H02H 3/08

[58] Field of Search .......... 317/33 SC, 60 A, 60 R, 317/52, 36 TD, 18 R, 135 A, 148.5 B; 307/252 R, 252 B

[56] References Cited

UNITED STATES PATENTS

| | | | |
|---|---|---|---|
| 3,211,958 | 10/1965 | Miller et al. | 317/60 R |
| 3,214,641 | 10/1965 | Sonnemann | 317/33 SC X |
| 3,296,498 | 1/1967 | Chassanoff et al. | 317/148.5 B |
| 3,334,272 | 8/1967 | Lipnitz | 317/36 |
| 3,418,529 | 12/1968 | Attewell | 317/33 SC X |
| 3,440,491 | 4/1969 | Tenenbaum et al. | 317/33 SC X |
| 3,441,800 | 4/1969 | Lee | 317/33 SC X |
| 3,544,846 | 2/1968 | Thompson | 317/33 SC |
| 3,723,818 | 3/1973 | Zocholl | 317/36 TD |

*Primary Examiner*—J D Miller
*Assistant Examiner*—Patrick R. Salce
*Attorney, Agent, or Firm*—William Freedman

[57] ABSTRACT

This trip circuit comprises a DC source and the series combination of a trip coil and a thyristor connected across the source. Connected between the source and the gate circuit of the thyristor is a triggering circuit including protective relay contacts that are operable to cause current from the source to flow through the triggering circuit and the gate circuit, thus firing the thyristor to produce effective energization of the trip coil. For producing effective energization of the trip coil in the event that the thyristor fails to fire, there is provided back-up energizing means in the form of a low ohmic resistor connected externally of the thyristor between its gate circuit and its cathode for providing a conductive path in series with the trip coil and the triggering circuit through which effective energizing current from the source can flow through the trip coil.

5 Claims, 2 Drawing Figures

TRIP CIRCUIT FOR AN ELECTRIC CIRCUIT BREAKER

BACKGROUND

This invention relates to a trip circuit for an electric circuit breaker and, more particularly, to a trip circuit that relies upon firing of a thyristor to produce high speed tripping but is still capable of operating to produce tripping even if the thyristor should for some reason fail to fire.

In order to effect high speed tripping of a circuit breaker, it is usually necessary to energize the trip coil of the circuit breaker with a relatively high current. Typically, the protective relay that initiates tripping has light-weight contacts that have limited ability to carry the high tripping current. A conventional way of handling this problem is to provide a seal-in relay that has more rugged contacts than those of the aforesaid protective relay and to operate this seal-in to establish a low impedance by-pass through its rugged contacts around those of the protective relay following initial operation of the protective relay. A problem that is sometimes present in such an approach, however, is that the contacts of the protective relay may have already been damaged by high initial tripping-current before the seal-in relay has had an opportunity to operate and divert current around the protective relay contacts. This problem is an especially troublesome one if the trip circuit is one which is designed to produce a high-amplitude initial pulse of tripping current to accelerate tripping. Such an initial current pulse, if required to traverse the protective relay contacts, would impose severe duty on such contacts.

One way of overcoming this problem is to utilize the initial tripping-current to produce high speed firing of a thyristor in series with the trip coil of the circuit breaker and in parallel with the protective relay contacts, thus diverting the high tripping current around the contacts of the protective relay and through the fired thyristor into the trip coil. My tripping circuit is one which utilizes this approach.

SUMMARY

An object of my invention is to increase the reliability of this type of tripping circuit by assuring that the circuit breaker will be tripped even if, for some remote reason, the thyristor should fail to fire when its gate is energized by initial tripping, or triggering, current.

In carrying out the invention in one form, I provide a DC source and the series combination of a trip coil and a thyristor connected across the source. Connected between the source and the gate circuit of the thyristor is a triggering circuit including protective relay contacts that are operable to cause current from the source to flow through the triggering circuit and the gate circuit, thus firing the thyristor to produce effective energization of the trip coil. For producing effective energization of the trip coil in the event that the thyristor fails to fire, there is provided back-up energizing means in the form of a low ohmic resistor connected externally of the thyristor between its gate circuit and its cathode. This resistor provides a conductive path in series with the trip coil and the triggering circuit through which current from the source can flow through the trip coil. The resistance of the resistor is sufficiently low to allow a high enough current from the source to pass through the series combination of the triggering circuit, the resistor, and the trip coil to produce effective energization of the trip coil by said latter current in the event that the thyristor fails to fire in response to operation of said contacts.

DETAILED DESCRIPTION OF PREFERRED EMBODIMENT

Figure 1:
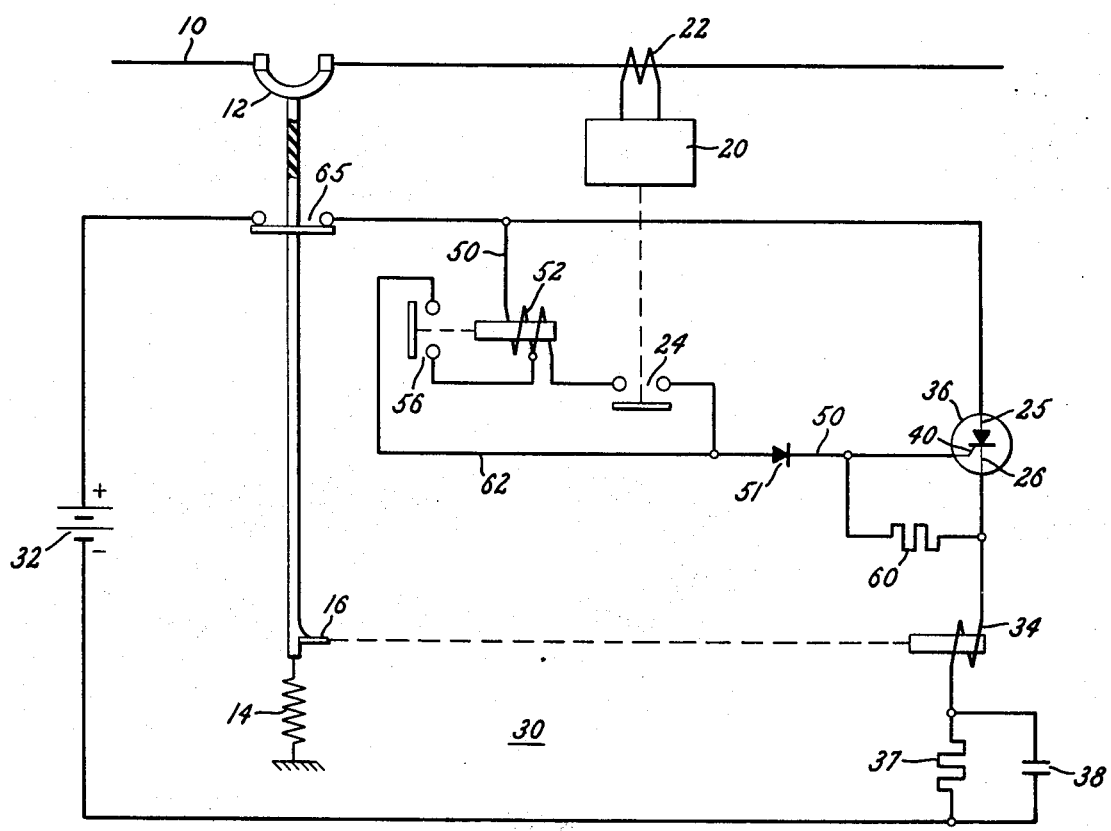
FIG. 1 is a circuit diagram of a trip circuit embodying one form of the invention.

Referring now to FIG. 1, there is shown a high-voltage power circuit 10 in which a conventional electric circuit breaker 12 is connected. The circuit breaker 12 is biased in an opening direction by a tension-type opening spring 14 and is held in its closed position by a trip latch 16. When latch 16 is operated, spring 14 opens the circuit breaker.

For sensing an abnormal condition, such as fault current, in power circuit 10, a suitable protective relay 20 is provided. This relay is coupled to power circuit 10 through a current transformer 22. When relay 20 responds to the abnormal condition, it rapidly operates a set of light-weight contacts 24. A trip circuit 30, soon to be described, responds to operation of these contacts to effect tripping of the circuit breaker 12.

Trip circuit 30 comprises a DC power source, such as a battery 32, and the series combination of the following elements connected across the terminals of the battery: a trip coil 34 for the circuit breaker, a thyristor 36, and the parallel combination of a resistor 37 and a capacitor 38. The thyristor is preferably a silicon controlled rectifier, or SCR. The structure and operating characteristics of the SCR are well known and are described in detail in such publications as the SCR Manual, 5th Edition, published in 1972 by General Electric Company, Syracuse, N.Y. The following brief comments, however, should facilitate an understanding of the invention.

The SCR comprises an anode 25, a cathode 26, and a gate 40. The anode-cathode circuit is normally essentially non-conducting. This circuit can be rendered conducting by passing a suitable trigger current through the gate-cathode circuit. Rendering the anode-cathode circuit conducting in this manner is referred to herein as triggering, or firing, of the SCR.

Figure 2:
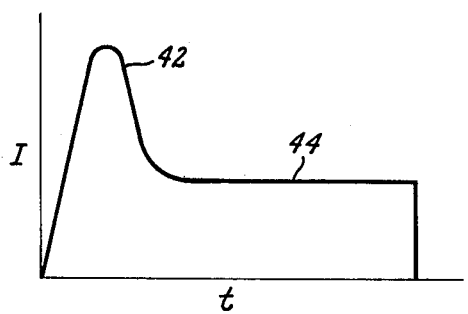
FIG. 2 is time-current graph showing the approximate wave form of the tripping current produced by the circuit of FIG. 1.

The resistor-capacitor combination 37, 38 is for the purpose of shaping the wave form of the current that passes through the trip coil 34 when the SCR is fired. A typical wave form for this current is shown in FIG. 2 where current is plotted against time. Before the SCR is fired, capacitor 38 is kept discharged by the resistor 37 connected thereacross. But when the SCR 36 is fired, the capacitor is charged by the initial flow of current through the anode-cathode circuit of the SCR, producing an initial current pulse through this circuit, as shown at 42 in FIG. 2, following which the SCR current is substantially constant at a lower level, as shown at 44 in FIG. 2. It is recognized that similar resistor-capacitor combinations have been used in other trip circuits for shaping the wave form of the tripping current.

The current depicted at 42, 44, of course, passes through the trip coil 34, which is in series with SCR 36. The current pulse 42, with its rapid build-up to a relatively high level, provides a high rate of force build-up by the trip coil 34, thus causing the desired high speed tripping of circuit breaker latch 16.

For triggering the SCR 36 into conduction, a triggering circuit 50 is provided. This triggering circuit 50 extends between the positive terminal of the battery 32 and the gate 40 of the SCR and includes the normally-open contacts 24 of the protective relay 20 and an isolating diode 51. In series with normally open contacts 24 is the coil 52 of a seal-in relay, which has a set of normally-open contacts 56 connected in parallel with contacts 24 and in series with most of the coil 52.

Connected externally of the SCR between its gate 40 and its cathode 26, there is a resistor 60 of relatively low ohmic value. This resistor 60 serves an important back-up function contributing to increased reliability, as will soon be described.

When protective relay 20 operates, it closes its contacts 24, completing triggering circuit 50 and causing current to flow through the SCR gate 40. This quickly triggers the SCR into conduction, causing the current depicted at 42, 44 of FIG. 2 to pass through the SCR via its anode and cathode and through the trip coil 34, thus effecting circuit-breaker tripping.

The above-described rapid triggering of the SCR protects the contacts 24 of the protective relay from damage by high current, since the SCR, upon firing, forms a low impedance by-pass around the contacts 24 through which most of the tripping current flows.

It is very important that the circuit breaker 12 be tripped whenever the relay 20 operates since failure of the circuit breaker to operate could result in damage to power circuit 10 and its components. The presence of low ohmic resistor 60 assures that such tripping will occur even if the SCR should, for some reason, fail to fire when its gate circuit 40 is energized. In this regard, the resistor 60 has a resistance sufficiently low that even if the gate circuit 40 has an infinite impedance, sufficient current will flow through the series combination of triggering circuit 50, resistor 60, and trip coil 34 to effect operation of the trip coil. Such operation may be slightly slower than that resulting from firing of the SCR 36, but it is still fast enough to provide an acceptable degree of protection for power circuit 10. For example, circuit breaker tripping without firing of the SCR may occur in about three cycles after fault-initiation instead of the 2 cycles available when the SCR fires. In view of its above function, resistor 60 is occasionally referred to herein as back-up energizing means.

The seal-in relay 52 is not needed to protect contacts 24 for normal tripping operations, i.e., in those cases where the SCR fires. But in the very unusual case when the SCR fails to fire, the seal-in relay will be picked up by current through gating circuit 50. Such pick-up closes seal-in contacts 56 to establish a low impedance shunt circuit 62 around contacts 24. A small amount of impedance is contained in the circuit spanned by shunt circuit 62, thus assuring that most of the current is directed into the shunt circuit 62.

To terminate the tripping signal when the circuit breaker has opened, a conventional *a* switch 65 is provided on the circuit breaker. This switch 65 opens when the circuit breaker opens, thus isolating the source 32 from the trip coil 34.

In a typical trip circuit, more than one trip coil would be energized by the tripping current. In one particular example, two trip coils 34 are connected in parallel where the single trip coil 34 is shown in FIG. 1. This parallel combination has a resistance of about 3.3 ohms. In this specific embodiment, components having the following values or characteristics can be utilized:

Battery 32 125 volts terminal voltage
Resistor 60 5 ohms
Resistor 37 5 ohms
Capacitor 38 4000 microfarads
Thyristor 36 General Electric SCR Type C 35D It is to be understood that these parameters are provided by way of example and not limitation. With these components present, the current through relay contacts 24 is limited to a maximum value of about 15 amperes.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim as new and desire to secure by Letters Patent of the United States is:

1. A trip circuit for an electric circuit breaker comprising:
   a. a source of DC control power,
   b. a trip coil that produces tripping of the circuit breaker when effectively energized,
   c. a thyristor having an anode, a cathode, a normally non-conducting anode-cathode circuit, and a gate circuit through which triggering current can flow to render said anode-cathode circuit conducting, thus firing said thyristor,
   d. means for connecting the series combination of said trip coil and said anode-cathode circuit across said source,
   e. a triggering circuit connected between a portion of said source and said gate circuit, said triggering circuit including protective relay contacts that are operable to cause current from said source to flow through said triggering circuit and said gate circuit and thus fire said thyristor, thereby producing effective energization of said trip coil when said thyristor is fired in response to operation of said relay contacts,
   f. and back-up energizing means for producing effective energization of said trip coil in the event said thyristor fails to fire in response to operation of said contacts, said back-up energizing means comprising:
   f'. an impedance connected externally of said thyristor between said gate circuit and said cathode for providing a conductive path in series with said trip coil and said triggering circuit through which current from said source can flow through said trip coil,
   f''. said impedace having a value sufficiently low to allow a high enough current from said source to pass through the series combination of said triggering circuit, said impedance, and said trip coil to produce effective energization of said trip coil by said latter current in the event that said thyristor fails to fire in response to operation of said contacts.

2. The trip circuit of claim 1 in which said impedance is a low ohmic resistor.

3. A trip circuit as defined in claim 1 and further comprising wave-shaping means for causing the current that flows through said anode-cathode circuit and said trip coil upon firing of said thyristor to have a wave form containing a high-amplitude initial pulse followed by continuing lower amplitude current.

4. The trip circuit of claim 3 in which said waveshaping means comprises the parallel combination of a second impedance and a capacitor connected in series with said trip coil and said anode-cathode circuit.

5. The trip circuit of claim 4 in which said impedance connected between said gate circuit and said cathode is a resistor having a resistance in the neighborhood of 5 ohms, said second impedance is a resistor having a resistance in the neighborhood of 5 ohms, and said trip coil is connected in parallel with one or more additional trip coils, the parallel combination of said trip coils having a resistance of about 3 ohms.

* * * * *